Sept. 30, 1924.
F. H. STANWOOD
1,509,883
STEERING WHEEL FOR AUTOMOBILES AND THE LIKE
Filed Feb. 25, 1918
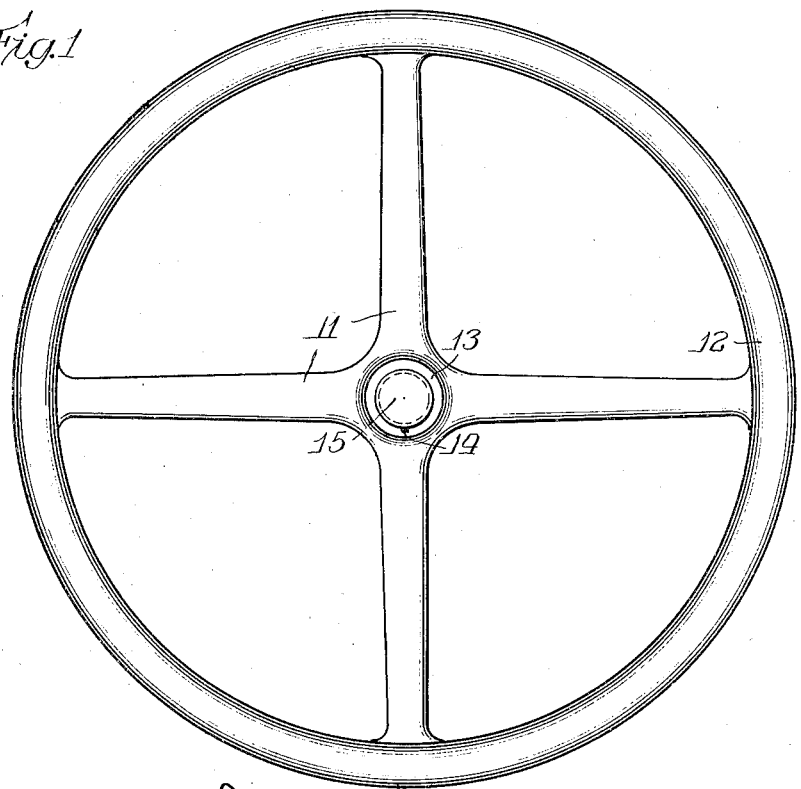
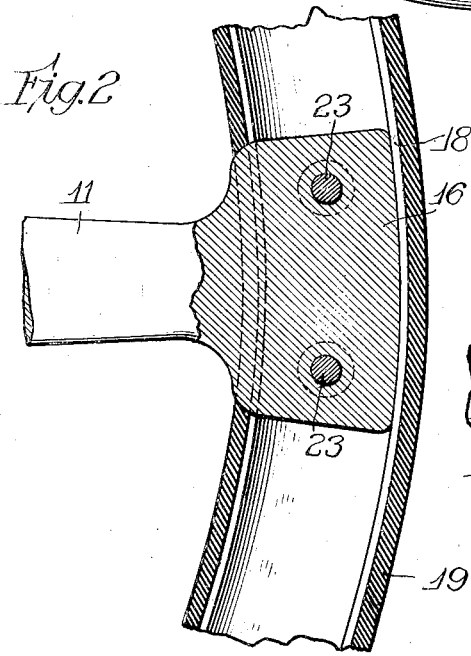
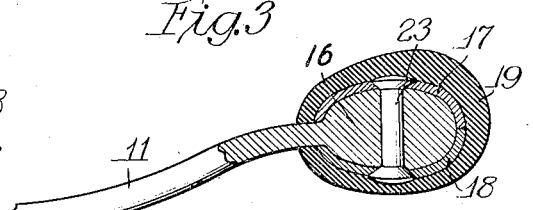
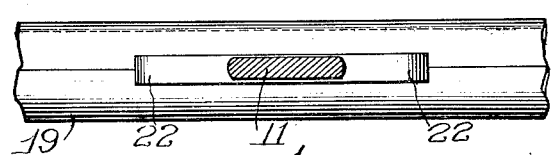
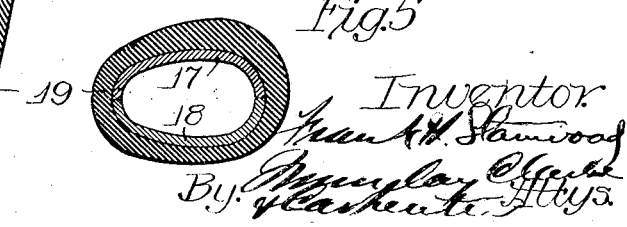

Patented Sept. 30, 1924.

1,509,883

UNITED STATES PATENT OFFICE.

FRANK H. STANWOOD, OF CHICAGO, ILLINOIS.

STEERING WHEEL FOR AUTOMOBILES AND THE LIKE.

Application filed February 25, 1918. Serial No. 219,003.

*To all whom it may concern:*

Be it known that I, FRANK H. STANWOOD, a citizen of the United States, residing in Chicago, in the county of Cook and State of Illinois, have invented a new and useful Improvement in Steering Wheels for Automobiles and the like, of which the following is a specification.

This invention relates in general to steering wheels for automobiles and the like, and has for its object broadly the provision of a steering wheel of improved and unusually strong construction and adapted to be comfortably used at all times of the year.

A further and highly important object of the invention is the provision of a metal steering wheel which may be used without inconvenience in cold weather.

A still further object of the invention is the provision of a steering wheel which may be grasped without danger of slipping in the hands of the user and yet permit a ready shifting of the hands as conditions in use may require.

A further object of the invention is the provision of a steering wheel made of simple parts, more cheaply provided than is usually possible with the wheels at present in use.

Other objects and advantages of the invention will be apparent as it is better understood from the following description when considered in connection with the accompanying drawing illustrating a preferred embodiment thereof.

On the drawing,

Figure 1 is a top plan view of a steering wheel embodying my invention;

Fig. 2 is a transverse partial sectional view;

Fig. 3 is a section taken substantially at right angles to the plane of the section in Fig. 1;

Fig. 4 is a section taken through the spokes and looking toward the wheel;

Fig. 5 is a section similar to Fig. 3 and taken between the spokes.

For the purpose of illustrating my invention, I have shown on the drawing a steering wheel in which it is embodied and comprising spokes 11 and a rim, generally indicated at 12. This wheel has the usual hub 13 keyed at 14 on the steering post 15 of the car. The spokes in the present instance are, as is usual, four in number and are provided at their outer ends with enlarged heads 16 which enter into the rim.

The rim in the present instance consists of two sheet metal interior members 17 and 18 and a thick rubber cover 19 upon them. The ends or heads 16 of the spokes are shaped or formed as indicated in Fig. 3 to fit nicely within or rather between the internal sheet metal members 17 and 18 which are recessed upon their inner edges to provide slots 22 through which the spokes extend. Two rivets or other fastening means 23 extend through the sheet metal rim members and through the end or head of each spoke fastening the metal portions of the wheel into a unitary structure. The heads act as reinforces to stiffen the sheet metal rim members and permit the use of relatively light readily formed members for the purpose.

The rubber covering 19 is preferably of appreciable thickness so that the hand may grip tightly into it for steering and upon a slight loosening may slip readily around it as it is desired to regrasp the wheel at other points. The rubber covering provides a warm hand-hold in winter and permits the use of metal although manifestly from certain aspects of the invention wood may be used in place of metal in the rim. The whole structure is light, cheap, simple and extremely strong.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A steering wheel for automobiles and the like, comprising a hollow sheet metal annulus, spokes having their ends disposed within and filling the cross-sectional area of said annulus, and a covering of soft rubber encasing said annulus and providing a permanent non-slipping non-heat-conducting hand hold, said covering consisting of an integral body having apertures therein to receive said spokes to prevent circumferential slipping of said cover with respect to said annulus.

2. A steering wheel for automobiles and the like, comprising spokes, a rim formed separately from the spoke and composed of two circular metal sheets disposed on opposite sides of the ends of the spokes, and fastening devices fastening through the spokes and rim members, said spoke ends substantially filling the cross-sectional area between said sheets and providing a support therefor.

3. A steering wheel for automobiles and the like, comprising spokes, a rim of hollow sheet metal construction into which the ends of the spokes extend, the ends of the spokes entirely filling a cross-sectional part of said rim.

4. A steering wheel for automobiles and the like comprising spokes, a rim of hollow sheet metal construction into which the ends of the spokes extend, the ends of said spokes having enlarged heads substantially filling the bore within the rim and through which fastening devices engaging opposite sides of the rim are disposed.

Signed in the presence of two subscribing witnesses.

FRANK H. STANWOOD.

Witnesses:
JOHN C. CARPENTER,
ETHEL WOOD.